Oct. 7, 1930.        E. HAMWI        1,777,723
PASTRY MOLD
Filed Sept. 23, 1929
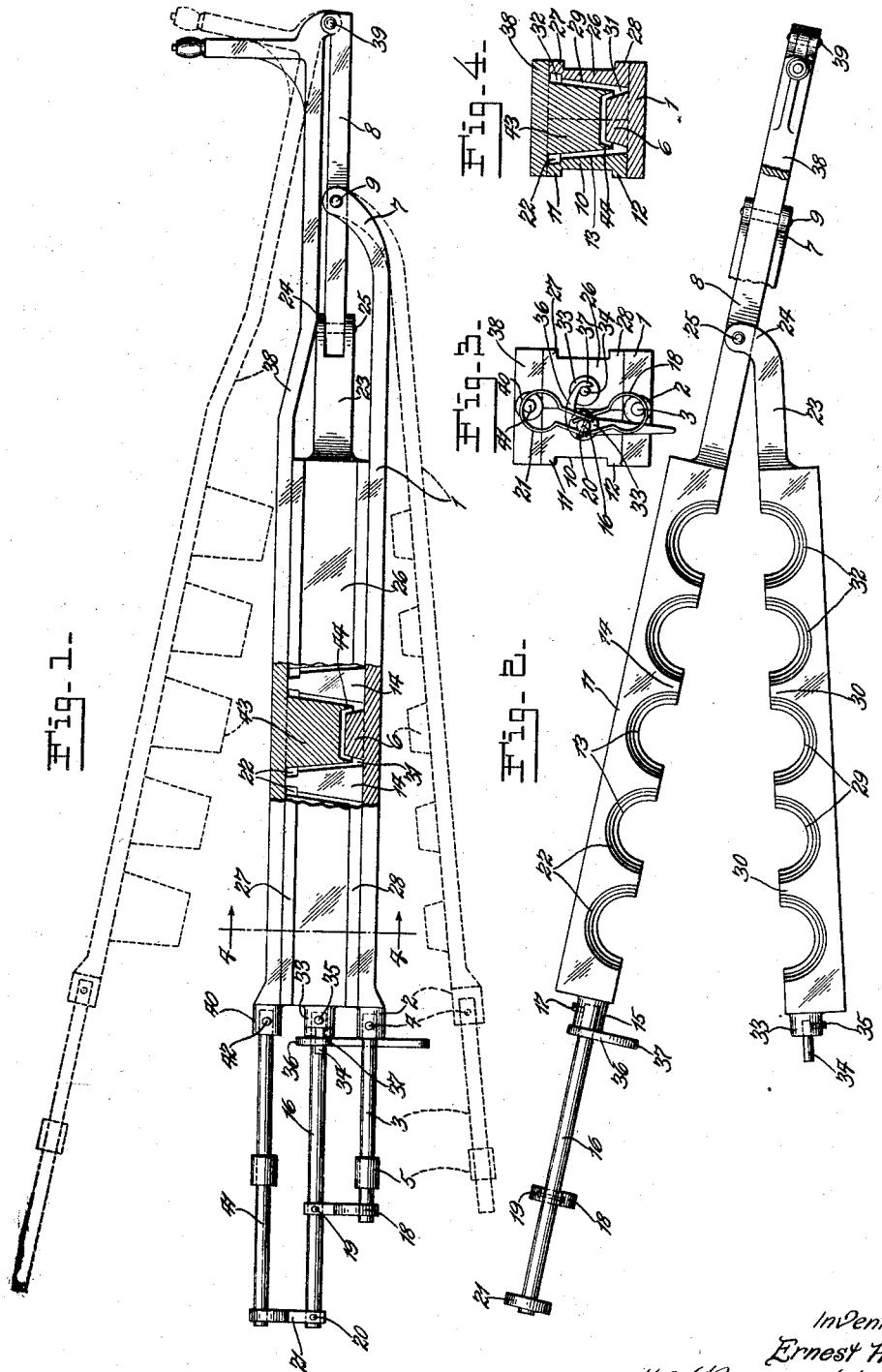
Inventor:
Ernest Hamwi,
by Rippey & Kingsland.
His Attorneys.

Patented Oct. 7, 1930

1,777,723

UNITED STATES PATENT OFFICE

ERNEST HAMWI, OF ST. LOUIS, MISSOURI

PASTRY MOLD

Application filed September 23, 1929. Serial No. 394,448.

This invention relates to pastry molds of the type designed and adapted for use in molding and baking edible pastry articles, such for instance as edible pastry cups; and the form of the molds may be varied widely without departure from the invention, so that the device may be used to produce different edible pastry forms and other articles.

An object of the invention is to provide an improved mold for use in molding and baking edible pastry cups and containers and other articles, and comprising mold elements assembled in separable sections which may be conveniently separated to release and discharge the molded cups, containers or other articles therefrom.

Another object of the invention is to provide an improved mold for use in molding and baking edible articles of pastry or the like, and comprising mold elements arranged and combined in a novel relationship whereby the articles may be conveniently released and discharged from the mold.

Various other objects and advantages of the invention will appear from the following description, reference being made to the accompanying drawing in which—

Fig. 1 is a side elevation, with a view of the parts shown in section, of a pastry mold embodying one form of the present invention.

Fig. 2 is a plan view of the receptacle member of the mold showing cooperative parts thereof separated as is done to release and discharge therefrom the mold articles.

Fig. 3 is a front end elevation of the mold.

Fig. 4 is a vertical cross sectional view of the mold on a line such as 4—4 of Fig. 1.

The mold, which is shown in the accompanying drawing in order to illustrate one embodiment of the invention, is designed and adapted for molding edible cups or pastry containers. It will be made apparent from the following portion of this specification, reference being made to the drawing, that the mold may be varied so as to mold articles of different shapes and that the invention is not limited to a mold for molding and baking cups or containers.

In the embodiment of the invention shown, the bar 1 has its front end provided with an extension 2 to which a rod or lever 3 is detachably secured by a fastener 4. The rod or lever 3 has mounted thereon a roller 5 designed and adapted to be mounted on a support on and along which the device is movable. The base bar 1 has on its upper side a series of truncated conical elevations 6. These elevations, as hereinafter made more clearly apparent, form raised bottoms in the cups or containers produced by this specific type of machine.

The rear end of the bar 1 has upwardly curved spaced arms 7 embracing between them an adjacent portion of a bar 8. The arms 7 are pivoted to the bar 8 by a pivot pin 9 which permits the bar 1 to be oscillated vertically to and from position to cooperate with the remaining portions of the mold.

The bar 8 is formed or connected with a part comprising an approximately vertical wall 10 having along the outer side of its upper edge a flange 11 and along the outer side of its lower edge a flange 12. The vertical portion 10 has on its inner side a series of semi-circular notches 13 separated by inward extensions 14 of the part 10. The end of the member 10 opposite from the part 8 is provided with an extension 15 to which a rod or lever 16 is attached by a removable fastener 17. A downwardly swinging loop 18 is supported from the rod or lever 16 by a pivot 19 and is designed and adapted to be engaged with the rod or lever 3 (Fig. 1) so as to support the bar 1 against the under edge of the part 10 (Figs. 1 and 4). The outer end of the rod or lever 16 has thereon a pivot 20 for supporting a ring or loop 21.

The notches or recesses 13 extend the full vertical width of the part 10 and taper downwardly. These notches or recesses 13 are semi-spherical in end elevation or cross section and the walls of said recesses or notches are spaced from the elevations 6 (Fig. 4) when the bar 1 is seated againts the lower edge of the part 10, so as to extend the elevations 6 into the notches or recesses 13. At the upper end of each of the notches or recesses 13 a notch or groove 22 is formed opposite the flange 11.

A bar 23 has on its rear end a pair of curved arms 24 which receive between them the bar 8. The arms 24 are pivoted to said bar 8 by a vertical pivot 25, the axis of which is at right angles to the axis of the pivot 9. For, whereas the bar 1 swings downwardly about the axis of the horizontal pivot 9, the bar 23 swings horizontally or laterally away from the bar 8. The bar 23 has in connection or integral therewith a vertical member 26 of the same vertical width as the member 10 and of similar shape and arrangement. That is to say, along the outside upper edge of the member 26 there is a flange 27 similar to the flange 11 and along the lower edge of said member 26 there is an outer flange 28 similar to the flange 12. And on the inner side of the member 26, there is a series of downwardly tapered notches 29 which are similar to the notches 13 and supported by inward extensions 30 similar to the inward extensions 14 and designed and arranged so that the inner ends of the extensions 14 and 30 abut together when the mold is closed and in position for use. These notches or recesses 29 are approximately semi-circular in plan or in cross section, so that when the extensions 14 and 30 are brought together in abutting contact a series of cups are formed by the recesses 13 and 29. The walls of the notches or recesses 29 are spaced from the elevations 6 when the bar 1 is in closed position. That is to say, when the bar 1 is seated against the lower edges of the members 10 and 26 and when the cup mold members are closed with their extensions 14 and 30 in abutting contact, a series of cups are formed having raised portions 6 in their bottoms forming annular grooves 31 in the bottoms of the cups, said grooves being between the elevations 6 and the walls of the cups, as will be clearly understood by reference to Fig. 4 of the drawing. The upper end of the member 26 has therein a notch 32 similar in all respects to the notch 22. The end of the member 26 that is opposite from the bar 23 is formed with an extension 33 to which a rod or lever 34 is attached by a detachable fastener 35. An arm 36 has one end pivoted on the rod or lever 16 and the opposite end is formed with a hook 37 designed and arranged to engage the rod or lever 34, so as to hold the members 10 and 26 in abutting contact, which is the position they occupy when in use.

The cooperating member of the mold for shaping the contents of the various cups into hollow cup-like form, so as to produce edible pastry cups or edible pastry articles, comprises a bar 38 having one end pivoted to the end of the bar 8 by a horizontal pivot 39. Thus, the bar 38 is capable of vertical swinging movements to and from position to seat upon the upper edges of the members 10 and 26 when said members are in closed formation. The end of the bar 38 opposite from the pivot 39 is provided with an extension 40, to which a rod or lever 41 is secured by a removable fastener 42. The rod or lever 41 is designed and arranged to be engaged and released by the ring or loop 21. In closed position, the bar 38 seats upon the upper edges of the members 10 and 26.

For each of the cups formed by the notches or recesses 13—29, the bar 28 supports a cooperating mold member comprising a downwardly tapered body 43 of less diameter than the diameter of the cups formed by said recesses 13 and 29; so that when the bar 38 is seated upon the members 10 and 26, the mold members 43 extend down into the respective cups of the cooperating mold members. The said mold members 43 are spaced from the walls of the respective cups into which said mold members extend and the lower ends of said mold members 43 are spaced from the upper ends of the elevations 6. The lower end of each of the mold members 43 has extending downwardly therefrom an annular flange 44 which extend downwardly into the annular grooves 31, but are spaced from the walls of said grooves (Fig. 4).

In operation of this device, the members 10 and 26 are placed in closed relationship in which the ends of the extensions 14 and 30 are in abutting contact. The hook 37 is engaged over the rod 34 to hold said parts 10 and 26 in that relationship in which the extensions 14 and 30 are in abutting contact, so as to form downwardly tapered receptacles. The lower ends of these downwardly tapered receptacles are closed by adjusting the bar 1 against the lower edges of the members 10 and 26, so as to extend the elevations 6 into the lower ends of the mold receptacles. The bar 1 may be held in this relationship by engaging the loop 18 with the rod or lever 3. The semi-fluid substance, from which the articles are to be formed, is then poured into the receptacles formed as aforesaid, a sufficient amount of such substance being poured into each of the cup-like mold receptacles. Then the bar 38 is closed downwardly upon the upper edges of the members 10 and 26, the mold members 43 being forced into the cup-like mold members, thereby shaping the material into cup-like form around the sides and lower ends of the mold members 43. Then the material is baked, so as to form friable, edible pastry or other articles which, in the embodiment of the invention herein shown and described, are cups. After the articles have been baked sufficiently, the mold is moved to a position convenient for removal of the articles from the mold. Then the holding devices are released, the bar 1 is lowered, as indicated by dotted lines in Fig. 1, the bar 38 is raised, so as to remove the mold members 43 from within the cup-like pastry articles, and the members 10 and 26 are moved laterally away from each other, as shown in Fig. 2, so as to release the cup-like articles therefrom.

From the foregoing, it is apparent that my invention is capable of wide variation as to form of articles to be produced; and that the invention obtains all of its intended objects in a highly efficient and satisfactory manner.

I do not restrict myself in any unessential respects, but what I claim and desire to secure by Letters Patent is:

1. A mold for molding hollow articles comprising two side mold members each having recesses in its side that is adjacent to the other member and which recesses in said respective members are opposite each other, means pivotally connecting said members for movement to closed and to open positions, a member movable to and from position to close the bottoms of said molds, means in connection with said bottom closing member for forming annular grooves in the bottoms of said molds, means cooperating with said molds to form hollow articles, and means for forming annular grooves in the bottoms of the articles formed in said molds.

2. A mold for molding edible pastry cups comprising wall sections forming a hollow mold member open at the top and the bottom, means for supporting said mold section in position to form said hollow mold and permitting said sections to be moved apart, a wall for closing the lower end of said mold, means for supporting said lower end wall in position to close the lower end of said mold and permitting movement of said lower end wall to open the lower end of said mold, an extension in connection with said lower end wall arranged to extend upwardly into the mold and spaced from the wall of said mold and forming therewith an annular groove, a cooperating mold member movable into and out of said mold and cooperating therewith to form hollow cups or containers, and means in connection with said cooperating mold member for forming an annular groove in the bottom of each cup or container.

3. A mold comprising two side wall members having opposite grooves in their adjacent faces, means for holding said wall members in sidewise abutting contact to form hollow molds by said grooves and permitting said wall members to be moved apart to discharge the contents of said molds, a wall member for closing the lower ends of said molds, means for supporting said bottom wall member in position to close the lower ends of said molds and permitting said bottom wall member to be moved to position to open the lower ends of said molds to permit the contents of said molds to be discharged downwardly, projections in connection with said bottom member for extending into said molds when said bottom wall member is in position to close the lower ends of said molds, cooperating mold members for shaping the contents of said molds into hollow articles, and means in connection with said cooperating mold members for forming indentations on the insides of the hollow articles.

4. A mold for molding a plurality of hollow articles at the same time comprising two side members each having a plurality of recesses in its side that is adjacent to the other member and which recesses in said respective members are opposite each other, means pivotally connecting said members for movement to closed positions in which said members are in abutting contact at opposite sides of said recesses respectively and to open positions in which said members are out of abutting contact, a member movable to and from position to close the bottoms of all of said molds, and means in connection with said bottom closing member for forming annular grooves in the bottoms of said molds.

5. A mold for simultaneously molding a plurality of hollow articles comprising two side mold members each having a plurality of recesses in its side that is adjacent to the other member and which recesses in said respective members are opposite each other, means pivotally connecting said members for movement to closed positions in which said members are in abutting contact at opposite sides of said recesses respectively and to open positions in which said members are out of abutting contact, a member movable to and from position to close the bottoms of said molds, means in connection with said bottom closing member for forming annular grooves in the bottoms of said molds, and means cooperating with said molds to form hollow articles.

6. A mold for molding a plurality of edible pastry cups simultaneously comprising two side mold members each having a plurality of recesses in its side that is adjacent to the other member and which recesses in said respective members are opposite each other, means pivotally connecting said members for movement to closed positions in which said members are in abutting contact at opposite sides of said recesses respectively and to open positions in which said members are out of abutting contact, and means cooperating with said mold members for forming pastry cups having recesses below their bottom walls and having annular grooves on their inner sides at their bottoms.

7. A mold for molding a plurality of edible pastry cups simultaneously comprising two pivotally connected members having opposite recesses in their adjacent sides cooperating to form hollow molds when said members are in sidewise abutting contact between said recesses, a bottom wall for closing the bottoms of said molds, means pivotally supporting said bottom wall for movement to and from position to close the bottoms of said molds, means in connection with said bottom wall for forming annular grooves in the bottoms of said molds, and cooperating mold members movable into and out of said molds and cooperating therewith to shape the contents of said molds into hollow cups.

8. A mold for molding a plurality of cups simultaneously comprising two side members having opposite recesses in their adjacent faces, means for holding said members in sidewise abutting contact between said recesses to form hollow molds and permitting said members to be moved apart to discharge the contents of said molds, a bottom wall member for closing the lower ends of said molds, means for supporting said bottom wall member in position to close the lower ends of said molds and permitting said bottom wall member to be moved to position to open the lower ends of said molds to permit the contents of said molds to be discharged downwardly, and projections in connection with said bottom wall member extending into said molds when said bottom member is in position to close the lower ends of said molds.

9. A mold for molding a plurality of cups simultaneously comprising two side members having opposite recesses in their adjacent faces, means for holding said members in sidewise abutting contact between said recesses to form hollow molds and permitting said members to be moved apart to discharge the contents of said molds, a bottom wall member for closing the lower ends of said molds, means for supporting said bottom wall member in position to close the lower ends of said molds and permitting said bottom wall member to be moved to position to open the lower ends of said molds to permit the contents of said molds to be discharged downwardly, projections in connection with said bottom wall member extending into said molds when said bottom member is in position to close the lower ends of said molds, and cooperating mold members for shaping the contents of said molds into cup form.

ERNEST HAMWI.